Patented Sept. 7, 1943

2,328,964

UNITED STATES PATENT OFFICE 2,328,964

REACTION PRODUCT OF ALDEHYDES AND DIAZINE DERIVATIVES

Gaetano F. D'Alelio and James W. Underwood, Pittsfield, Mass., assignors to General Electric Company, a corporation of New York No Drawing. Application October 12, 1942, Serial No. 461,771

20 Claims. (Cl. 260—42)

This invention relates to the production of new synthetic materials and especially to new reaction products having particular utility in the plastics and coating arts. Specifically the invention is concerned with compositions of matter comprising a condensation product of ingredients comprising an aldehyde, including polymeric aldehydes, hydroxyaldehydes and aldehyde-addition products, e. g., formaldehyde, paraformaldehyde, dimethylol urea, trimethylol melamine, aldol, glycollic aldehyde, etc., and a compound corresponding to the following general formula

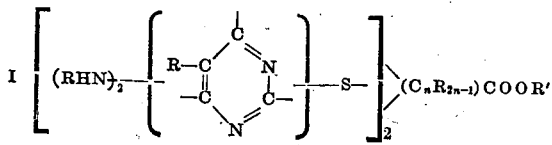

In the above formula $n$ represents an integer and is at least 1 and not more than 2, R represents a member of the class consisting of hydrogen and monovalent hydrocarbon and substituted hydrocarbon radicals, more particularly halohydrocarbon radicals, and R' represents a member of the class consisting of monovalent aliphatic hydrocarbon radicals and monovalent aromatic and nuclearly substituted, specifically nuclearly halogenated, aromatic hydrocarbon radicals Instead of the 1,3-diazinyl or pyrimidyl derivatives represented by the above formula, corresponding derivatives of the 1,2- or orthodiazines (pyridazines) or of the 1,4- or para-diazines (pyrazines) may be employed.

This application is a continuation-in-part of our copending application Serial No. 456,412, filed August 27, 1942, and assigned to the same assignee as the present invention.

Illustrative examples of radicals that R in the above formula may represent are: aliphatic (e. g., methyl, ethyl, propyl, isopropyl, butyl, secondary butyl, isobutyl, butenyl, amyl, isoamyl, hexyl, octyl, allyl, methallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, cinnamyl, phenylethyl, phenylpropyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals that R in the above formula may represent are: chloromethyl, chloroethyl, chlorophenyl, dichlorophenyl, ethyl chlorophenyl, chlorocyclohexyl, phenyl chloroethyl, bromoethyl, bromopropyl, fluorophenyl, iodophenyl, bromotolyl, etc.

Illustrative examples of monovalent aliphatic and aromatic hydrocarbon radicals that R' in the above formula may represent are radicals such as above mentioned with reference to R. Illustrative examples of monovalent, nuclearly substituted, specifically nuclearly halogenated, aromatic hydrocarbon radicals that R' also may represent are: chlorophenyl, dichlorophenyl, bromophenyl, dibromophenyl, iodophenyl, fluorophenyl, chlorotolyl, bromotolyl, chloroxylyl, chloronaphthyl, dichloronaphthyl, chloroxenyl, dichloroxenyl, bromoxenyl and the like.

Preferably R in Formula I represents hydrogen, in which case the compounds may be represented by the general formula:

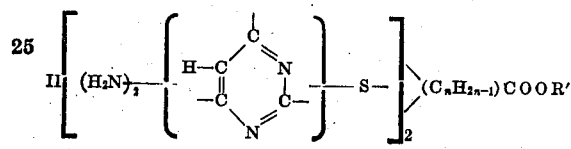

where $n$ and R' have the same meanings as given above with reference to Formula I. However, there also may be used in carrying the present invention into effect compounds such, for instance, as those represented by the general formula:

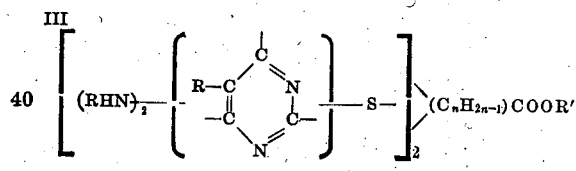

where $n$, R and R' have the same meanings as given above with reference to Formula I.

The esters of bis-(diazinyl thio) monocarboxylic aliphatic acids embraced by Formula I that are used in practicing the present invention are more fully described and are specifically claimed in our copending parent application Serial No. 456,412. As pointed out in this copending application, diazine derivatives of the kind employed in practicing the present invention are prepared by effecting reaction, in the presence of a hydrohalide acceptor, e. g., an alkali-metal hydroxide, between (1) a mercapto diazine corresponding to the general formula

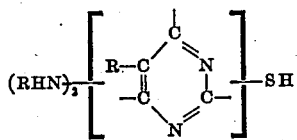

and (2) an ester of a dihalogenated aliphatic monocarboxylic acid corresponding to the general formula

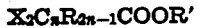

where X represents a halogen atom and $n$, R and R' have the same meanings as given above with reference to Formula I, the reactants being employed in the ratio of at least two mols of the mercapto diazine of (1) per mol of the ester of (2).

Examples of compounds embraced by Formula I that may be used in producing our new condensation products are listed below:

Methyl alpha,beta-bis-(4,6-diamino pyrimidyl-2 thio) propionate
Methyl alpha,beta-bis-(2,6-diamino pyrimidyl-4 thio) propionate, which also may be named methyl alpha,beta-bis-(2,4-diamino pyrimidyl-6 thio) propionate
Ethyl bis-(4,6-diamino pyrimidyl-2 thio) acetate
Ethyl bis-(2,6-diamino pyrimidyl-4- thio) acetate
Ethyl alpha,beta-bis-(4,6-diamino pyrimidyl-2 thio) valerate
Methyl alpha,beta-bis-[4,6 - di - (methylamino) pyrimidyl-2 thio] propionate
Phenyl bis-(4,6-diamino pyrimidyl-2 thio) acetate
Phenyl bis-(2,6-diamino pyrimidyl-4 thio) acetate
Tolyl bis-(4,6-diamino 5-tolyl pyrimidyl-2 thio) acetate
Xenyl alpha,beta-bis-(4,6-diamino 5-hexyl pyrimidyl-2 thio) propionate
Butyl alpha,beta-bis-(2,6-diamino 5-pentyl pyrimidyl-4 thio) propionate
Ethyl bis-[4,6-di-(methylamino) pyrimidyl-2 thio] acetate
Hexyl alpha,beta-bis-(2,6-diamino 5-chlorophenyl pyrimidyl-4 thio) propionate
Isobutyl bis-(4,6-diamino pyrimidyl-2 thio) acetate
Propenyl bis-(4,6-diamino pyrimidyl-2 thio) acetate
Phenyl bis-[4,6-di-(ethylamino) pyrimidyl-2 thio] acetate
Benzyl bis-[4,6-di-(isobutylamino) pyrimidyl-2 thio] acetate
Tolyl bis-(4,6-diamino pyrimidyl-2 thio) acetate
Ethyl alpha,beta-bis-(4,6-diamino pyrimidyl-2 thio) propionate
Phenyl beta,beta-bis-(4,6-diamino pyrimidyl-2 thio) propionate
Methyl bis-[4,6-di-(methylamino) pyrimidyl-2 thio] acetate
Methyl bis-[4,6 - di - (ethylamino) pyrimidyl-2 thio] acetate
Methyl bis-(4,6-diamino 5-methyl pyrimidyl-2 thio) acetate
Ethyl bis-[4,6-di-(ethylamino) pyrimidyl-2 thio] acetate
Phenyl bis-[4,6-di-(isobutylamino) pyrimidyl-2 thio] acetate
Fluorophenyl bis-[4,6-di-(cyclopentylamino) pyrimidyl-2 thio] propionates
Ethyl alpha-ethyl alpha,beta-bis-(4,6 ditoluido pyrimidyl-2 thio) propionate
Tolyl bis-[4,6-di-(propenylamino) pyrimidyl-2 thio] acetate
Phenyl alpha-phenyl beta,beta-bis-(4,6-diamino 5-methyl pyrimidyl-2 thio) propionate
Tolyl beta-propyl alpha-beta-bis-(2,6-diamino 5-ethyl pyrimidyl-4 thio) propionate
Methyl alpha,beta-bis-(4,6-diamino 5-xenyl pyrimidyl-2 thio) propionate
Methyl alpha,beta-bis-(2,6-diamino 5-methyl pyrimidyl-4 thio) propionate
Propyl alpha, beta-bis-(4,6-diamino pyrimidyl-2 thio) butyrate, which also may be named propyl beta-methyl alpha,beta-bis-(4,6-diamino pyrimidyl-2 thio) propionate
Ethyl alpha,beta-bis-(4-methylamino 6-amino pyrimidyl-2 thio) propionate
Methyl bis-[4,6 - di - (iodoanilino) pyrimidyl-2 thio] acetate
Methyl bis-[2,6-di-(chloroethylamino) pyrimidyl-4 thio] acetate
Methyl bis-[4,6-di-(ethylamino) 5-ethyl pyrimidyl-2 thio] acetate
Ethyl bis-(4,6-dianilino 5-isobutyl pyrimidyl-2 thio) acetate
Phenyl alpha,beta-bis-(4-methylamino 5-propenyl 6-ethylamino pyrimidyl-2 thio) propionate
Tolyl alpha,beta-bis-(4,6-dianilino 5-phenyl pyrimidyl-2 thio) propionate
Methyl bis-(4,6-diamino 5-cyclopentyl pyrimidyl-2 thio) acetate
Methyl bis-(2,6-diamino 5-methyl pyrimidyl-4 thio) acetate
Methyl alpha,beta-dimethyl alpha,beta-bis-(4,6-diamino pyrimidyl-2 thio) propionate, which also may be named methyl alpha-methyl alpha,beta-bis-(4,6-diamino pyrimidyl-2 thio) butyrate
Ethylphenyl bis-(4,6-diamino pyrimidyl-2 thio) acetate
Allyl bis-(4,6-diamino pyrimidyl-2 thio) acetate
Allyl alpha,beta-bis-(4,6-diamino pyrimidyl-2 thio) propionate
Methallyl beta,beta-bis-(4,6-diamino pyrimidyl-2 thio) propionate
Cyclohexyl bis-(2,6-diamino pyrimidyl-4 thio) acetate
Phenylethyl bis-(2,6-diamino pyrimidyl-4 thio) acetate
Phenylpropyl alpha,beta-bis-(4,6-diamino pyrimidyl-2 thio) propionate
Chlorophenyl bis-(4,6-diamino pyrimidyl-2 thio) acetate
Dichlorophenyl alpha,beta-bis-(2,6-diamino pyrimidyl-4 thio) propionate
Iodotolyl beta,beta-bis-(4,6-diamino pyrimidyl-2 thio) propionate
Tetradecyl bis-(4,6-diamino pyrimidyl-2 thio) acetate
Octyl alpha,beta-bis-(4,6-diamino pyrimidyl-2 thio) propionate
Pentyl bis-(2,6-diamino pyrimidyl-4 thio) acetate
Naphthyl alpha, beta-bis-(4,6-diamino 5-chlorophenyl pyrimidyl-2 thio) propionate
Xenyl bis-[4,6-di-(chloroanilino) 5-propyl pyrimidyl-2 thio] acetate
Ethyl alpha,beta - bis - [4,6 - di - (cyclohexenylamino) 5-butyl pyrimidyl-2 thio] propionate
Hexyl bis-[4,6-di-(bromopropylamino) 5-naphthyl pyrimidyl-2 thio] acetate
Bromophenyl alpha,beta-bis-(2,6-dianilino pyrimidyl-4 thio) acetate
Propyl alpha,beta-bis-[2,6-di-(allylamino) 5-allyl pyrimidyl-4 thio] propionate Crotyl bis-(4,6-diamino pyrimidyl-2 thio) acetate
Butenyl bis-(2,6-diamino 5-methyl pyrimidyl-4 thio) acetate
Chlorotolyl bis-(4,6-diamino 5-xenyl primidyl-2 thio) acetate It will be noted that in the above list of compounds there are included examples of aliphatic (e. g. alkyl, alkenyl), aromatic and nuclearly halogenated aromatic esters of bis-(pyrimidyl thio) acetic and propionic acids, more particularly aliphatic, aromatic and nuclearly halogenated aromatic esters of bis-(diamino pyrimidyl thio) acetic and propionic acids.

The present invention is based on our discovery that new and valuable materials having particular utility in the plastics and coating arts can be produced by effecting reaction between ingredients comprising essentially an aldehyde, including polymeric aldehydes, hydroxyaldehydes and aldehyde-addition products, and a diazine derivative of the kind embraced by Formula I, numerous examples of which have been given above and in our copending parent application Serial No. 456,412. Due to the numerous reactive positions in the diazine derivatives employed in practicing our invention, cured resinous aldehyde-reaction products prepared therefrom are outstanding in their resistance to water and organic solvents. The gloss and general appearance of molded articles made from molding compounds containing these new resins in heat-convertible state also are exceptionally good. Other improved properties, including improved plasticity combined with rapid-curing characteristics and, also, high resistance to heat and abrasion in the cured state, make the products of the present invention suitable for use in fields of utility, for instance in electrically insulating applications, for which resinous materials of lesser resistance to heat, water, abrasion and organic solvents would be wholly unsuited.

The reaction products of an aldehyde with a diazine derivative of the kind used in practicing our invention are not the equivalent of, and are not to be confused with, reaction products of an aldehyde with a triazine derivative having attached to the carbon atoms of the triazine nucleus two diamino [(—NHR)₂] groupings and one —S—C$_n$R$_{2n}$—COOR' groupings, where $n$, R and R' have the same meanings as given above with reference to Formula I.

In practicing our invention the initial condensation reaction may be carried out at normal or at elevated temperatures, at atmospheric, sub-atmospheric or super-atmospheric pressures, and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, we may use an alkaline substance such as sodium, potassium or calcium hydroxides, sodium or potassium carbonates, mono-, di- or tri-amines, etc. In some cases it is desirable to cause the initial condensation reaction between the components to take place in the presence of a primary condensation catalyst and a secondary condensation catalyst. The primary catalyst advantageously is either an aldehyde-non-reactable nitrogen-containing basic tertiary compound, e. g., tertiary amines such as trialkyl (e. g., trimethyl, triethyl, etc.) amines, triaryl (e. g., triphenyl, tritolyl, etc.) amines, etc., or an aldehyde-reactable nitrogen-containing basic compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the diazine derivative may be carried out in the presence or absence of solvents or diluents, other natural or synthetic resinous bodies, or while admixed with other materials that also can react with the aldehydic reactant or with the diazine derivative, e. g., urea, thiourea, selenourea, iminourea (guanidine), substituted ureas, thioureas, selenoureas and iminoureas, e. g., aldehyde-reactable urea derivatives such as mentioned in D'Alelio Patent No. 2,285,418, issued June 9, 1942, page 1, column 1, lines 40–49; monoamides of monocarboxylic and polycarboxylic acids and polyamides of polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aminotriazines, e. g., melamine, ammeline, ammelide, melem, melam, melon, numerous other examples being given in various copending applications of one or both of us, for instance in D'Alelio copending application Serial No. 377,524, filed February 5, 1941, and in applications referred to in said copending application; phenol and substituted phenols, e. g., the cresols, the xylenols, the tertiary alkyl phenols and other phenols such as mentioned, for example, in D'Alelio Patent No. 2,239,441, issued April 22, 1941; monohydric and polyhydric alcohols, e. g., butyl alcohol, amyl alcohol, heptyl alcohol, octyl alcohol, 2-ethylbutyl alcohol, ethylene glycol, propylene glycol, glycerine, polyvinyl alcohol, etc.; amines, including aromatic amines, e. g., aniline, etc.; and the like.

The modifying reactants may be incorporated with the diazine derivative and the aldehyde to form an intercondensation product by mixing all the reactants and effecting condensation therebetween or by various permutations of reactants as described, for example, in D'Alelio Patent No. 2,281,559, issued May 5, 1942 (page 2, column 1, lines 46–69), with particular reference to reactions involving a non-haloacylated urea, a haloacylated urea and an aliphatic aldehyde. For instance, we may form a partial condensation product of ingredients comprising (1) urea or melamine or urea and melamine, (2) a diazine derivative of the kind embraced by Formula I, for example, an aliphatic ester, more particularly an alkyl ester, of a bis-(diamino pyrimidyl thio) acetic acid or propionic acid, e. g., ethyl bis-(4,6-diamino pyrimidyl-2 thio) acetate, ethyl bis-(2,6-diamino pyrimidyl-4 thio) acetate, methyl alpha, beta-bis-(4,6-diamino pyrimidyl-2 thio) propionate, methyl alpha,beta-bis-(2,6-diamino pyrimidyl-4 thio) propionate, etc., an aromatic ester of a bis-(diamino pyrimidyl thio) acetic acid or propionic acid, e. g., phenyl bis-(4,6-diamino pyrimidyl-2 thio) acetate, phenyl bis-(2,6-diamino pyrimidyl-4 thio) acetate, a phenyl bis-(diamino pyrimidyl thio) propionate, etc., and (3) an aldehyde, including polymeric aldehydes, hydroxyaldehydes and aldehyde-addition products, for instance formaldehyde, paraformaldehyde, glyceraldehyde, dimethylol urea, a polymethylol melamine, e. g., hexamethylol melamine, etc. Thereafter we may effect reaction between this partial condensation product and, for example, a curing reactant, specifically a chlorinated acetamide, to form a heat-curable composition.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting resinous condensation products, alone or mixed with fillers, pigments, dyes, lubricants, plasticizers, curing agents, etc., may be used, for example, in the production of molding compositions.

The liquid intermediate condensation products of the invention may be concentrated or diluted further by the removal or addition of volatile solvents to form liquid coating compositions of adjusted viscosity and concentration. The heat-convertible or potentially heat-convertible resinous condensation products may be used in liquid state, for instance as surface-coating materials, in the production of paints, varnishes, lacquers, enamels, etc., for general adhesive applications, in producing laminated plywood structures and other laminated articles, and for numerous other purposes. The liquid heat-hardenable or potentially heat-hardenable condensation products may be used directly as casting resins, while those which are of a gel-like nature in partially condensed state may be dried and granulated to form clear, unfilled heat-convertible resins.

In order that those skilled in the art better may understand how the present invention may be carried into effect, the following examples are given by way of illustration and not by way of limitation. All parts are by weight.

Example 1

| | Parts |
|---|---|
| Methyl alpha,beta - bis - (4,6-diamino pyrimidyl-2 thio) propionate | 27.6 |
| Aqueous formaldehyde (approx. 37.1% HCHO) | 30.5 |
| Aqueous ammonia (approx. 28% NH₃) | 2.7 |
| Aqueous solution of sodium hydroxide (0.52 N) | 1.5 |
| Chloroacetamide (monochloroacetamide) | 0.3 |

All of the above ingredients with the exception of the chloroacetamide were heated together under reflux at the boiling temperature of the mass for 6 minutes. The chloroacetamide was now added and heating under reflux was continued for an additional 2 minutes. The resulting resinous syrup was mixed with 20.3 parts alpha cellulose in flock form and 0.2 part of a mold lubricant, specifically zinc stearate, to form a molding (moldable) composition. The wet molding compound was dried at room temperature for about 16 hours. A well-cured molded piece having excellent cohesive characteristics and good heat and water resistance was obtained by molding a sample of the dried and ground molding compound for 3 minutes at 135° C. under a pressure of 2,500 pounds per square inch. The molding compound showed very good plastic flow during molding.

Example 2

| | Parts |
|---|---|
| Methyl alpha,beta - bis - (4,6-diamino pyrimidyl-2 thio) propionate | 11.1 |
| Urea | 7.2 |
| Aqueous formaldehyde (approx. 37.1% HCHO) | 30.5 |
| Aqueous ammonia (approx. (28% NH₃) | 1.8 |
| Aqueous solution of sodium hydroxide (0.52 N) | 1.3 |
| Chloroacetamide | 0.25 |

A clear, syrupy condensation product was formed by heating together all of the above components with the exception of the chloroacetamide for 25 minutes at boiling temperature under reflux. At the end of this reaction period the chloroacetamide was added and heating under reflux at boiling temperature was continued for an additional 5 minutes. A molding compound was prepared by mixing the resulting resinous syrup with 17 parts alpha cellulose and 0.2 part zinc stearate. The wet molding composition was dried at room temperature until sufficient moisture had been removed to provide a material that could be molded satisfactorily. A well-cured molded piece having a well-knit and homogeneous structure was obtained by molding a sample of the dried and ground molding compound for 3 minutes at 135° C. under a pressure of 2,000 pounds per square inch. The heat resistance of the molded article was better than that of an article similarly prepared from a molding compound containing a urea-formaldehyde resinous syrup wherein none of the above-identified diazine derivative was used in its preparation. The molding compound exhibited satisfactory plastic flow during molding.

Instead of using chloroacetamide in accelerating the curing of the potentially reactive resinous material as described under Examples 1 and 2, heat-convertible compositions may be produced by adding to the partial condensation product (in syrupy or other form) direct or active curing catalysts (e. g., citric acid, phthalic anhydride, malonic acid, oxalic acid, etc.), or latent curing catalysts (e. g., sodium chloroacetate, N-diethyl chloroacetamide, glycine ethyl ester hydrochloride, etc.), or by intercondensation with curing reactants other than monochloroacetamide (e. g., di- and tri-chloroacetamides, chloroacetonitriles, alpha,beta-dibromopropionitrile, ethylene diamine hydrochloride, aminoacetamide hydrochloride, the ethanolamine hydrochlorides, nitrourea, chloroacetyl urea, chloroacetone, glycine, sulfamic acid, citric diamide, phenacyl chloride, etc.). Other examples of curing reactant that may be employed to accelerate or to effect the curing of the thermosetting or potentially thermosetting resins of the foregoing and other examples are given in various copending applications of one or both of us, for instance in D'Alelio copending applications Serial No. 346,962, filed July 23, 1940, and Serial No. 354,395, filed August 27, 1940, both of which applications are assigned to the same assignee as the present invention.

Example 3

| | Parts |
|---|---|
| Methyl alpha,beta-bis (4,6-diamino pyrimidyl-2 thio) propionate | 27.6 |
| Para-toluene sulfonamide | 12.8 |
| Aqueous formaldehyde (approx. 37.1% HCHO) | 60.5 |
| Aqueous solution of sodium hydroxide (0.52 N) | 2.5 |
| Chloroacetamide | 0.5 |

All of the above ingredients with the exception of the chloroacetamide were heated together under reflux at the boiling temperature of the mass for 14 minutes. The chloroacetamide was now added and heating under reflux was continued for an additional 1 minute. The resulting resinous syrup was mixed with 33.7 parts alpha cellulose and 0.2 part zinc stearate to form a molding compound. The wet molding composition was dried first at 60° C. and then at room temperature until sufficient moisture had been removed to provide a material that could be molded satisfactorily. A sample of the dried and ground molding compound was molded for 3 minutes at 135° C. under a pressure of 4,000 pounds per square inch. The molded piece was well cured throughout and had a well-knit and homogeneous structure. Satisfactory plastic flow during molding was evidenced by the amount of flash on the molded piece.

Example 4

| | Parts |
|---|---|
| Methyl alpha,beta-bis (4,6-diamino pyrimidyl-2 thio) propionate | 27.6 |
| Dimethylol urea (commercial grade, containing approx. 11% by weight of water) | 50.5 |
| Aqueous ammonia (approx. 28% NH₃) | 2.8 |
| Aqueous solution of sodium hydroxide (0.52 N) | 2.0 |
| Chloroacetamide | 0.4 |
| Water | 100.0 |

All of the above ingredients with the exception of the chloroacetamide were heated together under reflux at the boiling temperature of the mass for 25 minutes. The above-stated amount of chloroacetamide was now added, followed by the addition of a small amount of formaldehyde. Thereafter the mixture was heated for an additional 5 minutes under reflux at the boiling temperature of the mass. The resulting resinous syrup was mixed with 27.1 parts alpha cellulose and 0.2 part zinc stearate to form a molding composition. The wet molding compound was dried first at 60° C. for a few hours and then at room temperature for about 16 hours. A well-cured molded piece having a well-knit and homogeneous structure was obtained by molding a sample of the dried and ground molding compound for 3 minutes at 135° C. under a pressure of 3,500 pounds per square inch. The molding compound showed good flow characteristics during molding.

The dimethylol urea in the above formula may be replaced in whole or in part by an equivalent amount of other aldehyde-addition products, for instance by a polymethylol aminotriazine, e. g., trimethylol melamine, hexamethylol melamine, etc.

Example 5

A liquid, phenol-formaldehyde partial condensation product was prepared by heating together a mixture of the following components for 4 hours at 65° C.:

| | Parts |
|---|---|
| Synthetic phenol | 90.0 |
| Aqueous formaldehyde (approx. 37.1% HCHO) | 195.0 |
| Potassium carbonate | 2.85 |

The syrupy reaction product thereby obtained is identified in the following formula as "syrupy phenolic resin":

| | Parts |
|---|---|
| Syrupy phenolic resin | 60.0 |
| Methyl alpha,beta-bis-(4,6-diamino pyrimidyl-2 thio) propionate | 1.9 |
| Aqueous ammonia (approx. 28% NH₃) | 0.5 |
| Oxalic acid | 1.1 |

All of the above ingredients with the exception of the oxalic acid were heated together under reflux at the boiling temperature of the mass for 25 minutes. At the end of this reaction period the above-stated amount of oxalic acid, dissolved in a small amount of water, was added to the resinous syrup thereby produced, which immediately thereafter was mixed with 21 parts alpha cellulose and 0.2 part zinc stearate, to form a molding composition. The wet molding compound was dried first at 60° C. and then at room temperature until sufficient moisture had been removed to provide a material that could be molded satisfactorily. A sample of the dried and ground molding compound was molded for 3 minutes at 135° C. under a pressure of 3,800 pounds per square inch. The molded piece was well cured throughout and had a well-knit and homogeneous structure. It had very good resistance to water as shown by the fact that it absorbed only 1.95% by weight of water when immersed in boiling water for 15 minutes, followed by immersion in cold water for 5 minutes. The molding compound exhibited good plasticity during molding as evidenced by the amount of flash on the molded piece.

Example 6

| | Parts |
|---|---|
| Methyl alpha,beta-bis-(4,6-diamino pyrimidyl-2 thio) propionate | 13.8 |
| Acrolein | 10.5 |
| Aqueous solution of sodium hydroxide (0.52 N) | 0.5 |
| Water | 50.0 | were heated together under reflux at the boiling temperature of the mass for 5 minutes, at the end of which reaction period a resinous mass had precipitated from the solution. This resin was potentially heat-curable, as shown by the fact that when a small amount of chloroacetamide, sulfamic acid, glycine, nitrourea, chloral urea or other curing agent such as mentioned under Example 2 was incorporated therein, followed by heating on a 140° C. hot plate, the resin cured to an insoluble and infusible state. The resinous material of this example may be used in the preparation of molding compounds.

Example 7

| | Parts |
|---|---|
| Methyl alpha,beta-bis-(4,6-diamino pyrimidyl-2 thio) propionate | 12.3 |
| Aqueous formaldehyde (approx. 37.1% HCHO) | 27.0 |
| Aqueous solution of sodium hydroxide (0.52 N) | 1.0 |
| Butyl alcohol | 19.8 |

All of the above ingredients with the exception of the butyl alcohol were heated together under reflux at the boiling temperature of the mass for 8 minutes. At the end of this reaction period the butyl alcohol was added and refluxing at boiling temperature was continued for an additional 10 minutes. The cloudy, resinous syrup thereby obtained was dehydrated by heating it on a steam plate. The dehydrated syrup was soluble in ethylene glycol and partially soluble in butyl alcohol. Glass plates were coated with samples of the dehydrated syrup, both with and without a small amount of an acid, specifically hydrochloric acid, as a curing agent. The coated plates were baked for several hours at 60° C. The baked films were transparent and smooth, and adhered tightly to the glass surface. Instead of hydrochloric acid, we may use chloroacetamide, glycine, ethanolamine hydrochlorides, citric acid, oxalic acid or other curing agent such as mentioned under Example 2 as an accelerator of curing of the syrupy condensation product. The product of this example may be employed in the preparation of various coating and impregnating compositions. It may be used as a modifier of varnishes of the aminoplast and alkyd-resin types.

The butyl alcohol in the above formulae may be replaced by other alcohols, e. g., by propyl alcohol, isopropyl alcohol, pentyl alcohol, isopentyl alcohol, isobutyl alcohol, etc.

Example 8

| | Parts |
|---|---|
| Methyl alpha,beta-bis-(4,6-diamino pyrimidyl-2 thio) propionate | 27.6 |
| Diethyl malonate | 12.0 |
| Aqueous formaldehyde (approx. 37.1% HCHO) | 61.0 |
| Aqueous solution of sodium hydroxide (0.52 N) | 2.5 | were heated together under reflux at the boiling temperature of the mass for 15 minutes, yielding a clear, syrupy condensation product. The plasticizing effect of the diethyl malonate was apparent when various curing agents such as mentioned under Example 2 were added to samples of the resinous syrup, followed by heating on a 140° C. hot plate. With sodium chloroacetate or trichloroacetamide, the syrup cured relatively slowly to an insoluble, infusible state under heat. Sulfamic acid, monochloroacetamide, alpha,beta-dibromopropionitrile, etc., effected curing more rapidly under heat to insoluble and infusible resinous masses. The resinous material of this example may be used as a modifier of rapidly curing aminoplasts and other compatible synthetic resins to improve their flow or plasticity characteristics.

Example 9

| | Parts |
|---|---|
| Methyl alpha,beta-bis-(4,6-diamino pyrimidyl-2 thio) propionate | 12.3 |
| Glycerine | 6.2 |
| Aqueous formaldehyde (approx. 37.1% HCHO) | 27.0 |
| Aqueous solution of sodium hydroxide (0.52 N) | 1.0 | were heated together under reflux at the boiling temperature of the mass for 18 minutes, yielding a clear, resinous syrup. This syrup was dehydrated by heating it on a hot plate. The dehydrated syrup was soluble in ethylene glycol. A sample of the dehydrated syrup was acidified with a small amount of hydrochloric acid, after which a glass plate was coated with a sample of the dehydrated syrup. The coated plate was baked for several hours at 70° C. The baked film was smooth, hard and semi-transparent, and adhered tightly to the glass surface. The resinous material of this example is especially suitable for use in the preparation of baking varnishes and other coating and impregnating compositions.

Example 10

| | Parts |
|---|---|
| Methyl alpha,beta-bis-(4,6-diamino pyrimidyl-2 thio) propionate | 27.6 |
| Polyvinyl alcohol | 3.4 |
| Aqueous formaldehyde (approx. 37.1% HCHO) | 61.0 |
| Aqueous solution of sodium hydroxide (0.52 N) | 2.5 |
| Water | 50.0 |

All of the above ingredients were heated together under reflux at the boiling temperature of the mass for 15 minutes. The resulting resinous syrup was potentially heat-curable as evidenced by the fact that when citric acid, sulfamic acid, chloroacetamide, hydrochloric acid or other curing agent such as mentioned under Example 2 was incorporated into the syrupy condensation product, followed by heating on a 140° C. hot plate, the syrup cured to an insoluble and infusible state. A glass plate was coated with a sample of the syrup acidified with a small amount of hydrochloric acid. The coated plate was baked for several hours at 70° C. The baked film was smooth, opaque and very hard. It adhered tightly to the glass surface. The resinous material of this example may be used in the production of molding compositions or it may be employed in the preparation of various liquid coating and impregnating compositions.

It will be understood, of course, by those skilled in the art that the reaction between the aldehyde and the diazine derivative may be effected at temperatures ranging, for example, from room temperature to the fusion or boiling temperature of the mixed reactants or of solutions of the mixed reactants, the reaction proceeding more slowly at normal temperature than at elevated temperatures in accordance with the general law of chemical reactions. Thus, instead of effecting reaction between the ingredients of the foregoing examples under reflux at the boiling temperature of the mass as mentioned in the individual examples, the reaction between the components may be carried out at lower temperatures, for example at temperatures ranging from room temperature to a temperature near the boiling temperature using longer reaction periods and, in some cases, stronger catalysts and higher catalyst concentrations.

It also will be understood by those skilled in the art that our invention is not limited to condensation products obtained by reaction of ingredients comprising an aldehyde and the specific diazine derivative embraced by Formula I that is named in the above illustrative examples. Thus, instead of methyl alpha,beta-bis-(4,6-diamino pyrimidyl-2 thio) propionate, we may use, for example, methyl alpha,beta-bis-(2,6-diamino pyrimidyl-4 thio) propionate, other alkyl and alkenyl bis-(diamino pyrimidyl thio) propionates, an aromatic (e. g., a phenyl, tolyl, xylyl, etc.) ester of a bis-(diamino pyrimidyl thio) propionic acid, a nuclearly halogenated aromatic (e. g., a nuclearly chlorinated or brominated aromatic) ester of a bis-(diamino pyrimidyl thio) propionic acid, an aliphatic, aromatic or nuclearly halogenated aromatic ester of a bis-(diamino pyrimidyl thio) acetic acid, or any other diazine derivative of the kind embraced by Formula I, numerous examples of which have been given herein and in our copending application Serial No. 456,412.

In producing these new condensation products the choice of the aldehyde is dependent largely upon economic considerations and upon the particular properties desired in the finished product. We prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, heptaldehyde, octaldehyde, methacrolein, crotonaldehyde, benzaldehyde, furfural, hydroxyaldehydes (e. g., aldol, glucose, glycollic aldehyde, glyceraldehyde, etc.), mixtures thereof, or mixtures of formaldehyde (or compounds engendering formaldehyde) with such aldehydes. Illustrative examples of aldehyde-addition products that may be employed instead of the aldehydes themselves are the mono- and poly-(N-carbinol) derivatives of urea, thiourea, selenourea and iminourea, and of substituted ureas, thioureas, selenoureas and iminoureas, mono- and poly-(N-carbinol) derivatives of amides of polycarboxylic acids, e. g., maleic, itaconic, fumaric, malonic, succinic, citric, phthalic, etc., mono- and poly-(N-carbinol) derivatives of the aminotriazines, of the aminotriazoles, etc. Particularly good results are obtained with active methylene-containing bodies such, for example, as a methylol urea, more particularly mono- and di-methylol ureas, and a methylol aminotriazine, e. g., monomethylol melamine and polymethylol melamines (di-, tri-, tetra-, penta and hexamethylol melamines). Mixtures of aldehydes and aldehyde-addition products may be used, e. g., mixtures of formaldehyde and methylol compounds such, for instance, as dimethylol urea, trimethylol melamine, hexamethylol melamine, etc.

The ratio of the aldehydic reactant to the diazine derivative may be varied over a wide range depending, for example, upon the particular starting reactants employed and the particular properties desired in the finished product. Ordinarily these reactants are employed in an amount corresponding to at least one mol of the aldehyde, specifically formaldehyde, for each mol of the diazine derivative. Thus, we may use, for instance, from 1 to 12 or 15 or more mols of an aldehyde for each mol of the diazine derivative. When the aldehyde is available for reaction in the form of an alkylol derivative, more particularly a methylol derivative such, for example, as dimethylol urea, trimethylol melamine, etc., then higher amounts of such aldehyde-addition products are used, for instance from 2 or 3 up to 25 or 30 or more mols of such alkylol derivatives for each mol of the diazine derivative.

As indicated hereinbefore, and as further shown by a number of the examples, the properties of the fundamental resins of this invention may be varied widely by introducing other modifying bodies before, during or after effecting condensation between the primary components. Thus, as modifying agents we may use, for instance, monohydric alcohols, e. g., methyl, ethyl, propyl, isopropyl, isobutyl, hexyl, etc., alcohols; polyhydric alcohols such, for example, as diethylene glycol, triethylene glycol, pentaerythritol, etc.; alcohol-ethers, e. g., ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, etc.; amides, e. g., formamide, stearamide, acrylamide, benzene sulfonamides, toluene sulfonamides, adipic diamide, phthalamide, etc.; amines, e. g., ethylene diamine, phenylene diamine, etc.; ketones, including halogenated ketones; nitriles, including halogenated nitriles, e. g., acrylonitrile, methacrylonitrile, chloroacetonitriles, etc.; acylated ureas, including halogenated acylated ureas of the kind described, for example, in D'Alelio Patent No. 2,281,559, issued May 5, 1942; and others.

The modifying bodies also may take the form of high molecular weight bodies with or without resinous characteristics, for example hydrolyzed wood products, formalized cellulose derivatives, lignin, protein-aldehyde condensation products, aminotriazine-aldehyde condensation products (e. g., melamine-formaldehyde condensation products), aminotriazole-aldehyde condensation products, etc. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers, including polyvinyl acetals, specifically polyvinyl formal, etc.

Instead of effecting reaction between a diazine derivative of the kind embraced by Formula I and an aldehyde, specifically formaldehyde, we may cause an aldehyde to condense with a salt (organic or inorganic) of the diazine derivative or with a mixture of the diazine derivative and a salt thereof. Examples of organic and inorganic acids that may be used in the preparation of such salts are hydrochloric, sulfuric, phosphoric, acetic, chloroacetic, propionic, butyric, valeric, acrylic, oxalic, malonic, methacrylic, polyacrylic, polymethacrylic, succinic, adipic, maleic, fumaric, benzoic, salicylic, phthalic, camphoric, etc.

Dyes, pigments, plasticizers, mold lubricants, opacifiers and various fillers (e. g., wood flour, glass fibers, asbestos, including defibrated asbestos, mineral wool, cloth cuttings, etc.) may be compounded with the resin in accordance with conventional practice to provide various thermoplastic and thermosetting molding compositions.

The modified and unmodified resinous compositions of this invention have a wide variety of uses. For example, in addition to their use in the production of molding compositions, they may be employed as modifiers of other natural and synthetic resins, as laminating varnishes in the production of laminated articles wherein sheet materials, e. g., paper, cloth, sheet asbestos, wood veneer, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They may be employed for treating cotton, linen and other cellulosic materials in sheet or other form. They also may be used as impregnants for electrical coils and for other electrically insulating applications.

What we claim as new and desire to secure by Letters Patent of the United States is:

1. A composition of matter comprising the product of reaction of ingredients comprising an aldehyde and a compound corresponding to the general formula

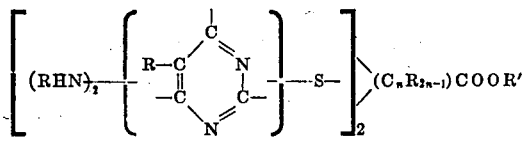

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

2. A composition of matter comprising the product of reaction of ingredients comprising formaldehyde and a compound corresponding to the general formula

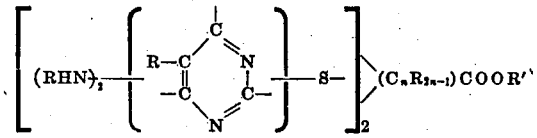

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

3. A composition of matter comprising the product of reaction of ingredients comprising an aldehyde and a compound corresponding to the general formula

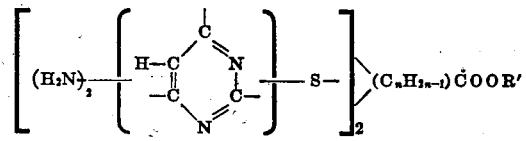

where $n$ represents an integer and is at least 1 and not more than 2, and R' represents a monovalent aliphatic hydrocarbon radical.

4. A composition of matter comprising the product of reaction of ingredients comprising an aldehyde and a compound corresponding to the general formula

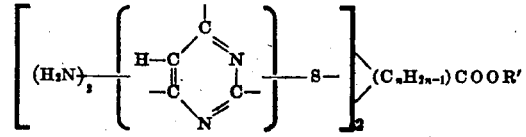

where $n$ represents an integer and is at least 1 and not more than 2, and R' represents a monovalent aromatic hydrocarbon radical.

5. A composition as in claim 1 wherein the reaction product is the product obtained by effecting initial reaction between the stated components under alkaline conditions.

6. A composition as in claim 1 wherein the reaction product is an alcohol-modified reaction product of the stated components.

7. A heat-curable resinous composition comprising the heat-convertible condensation product of ingredients comprising formaldehyde and a compound corresponding to the general formula

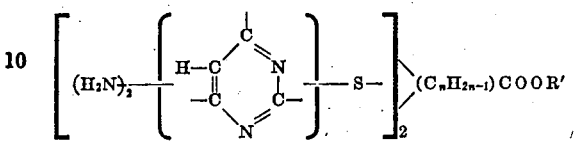

where $n$ represents an integer and is at least 1 and not more than 2, and R' represents a member of the class consisting of monovalent aliphatic hydrocarbon radicals and monovalent aromatic and nuclearly halogenated aromatic hydrocarbon radicals.

8. A product comprising the cured resinous composition of claim 7.

9. A composition of matter comprising the resinous condensation product of ingredients comprising an aldehyde and an alkyl ester of a bis-(diamino pyrimidyl thio) acetic acid.

10. A composition of matter comprising the resinous condensation product of ingredients comprising an aldehyde and an aromatic ester of a bis-(diamino pyrimidyl thio) acetic acid.

11. A composition of matter comprising the resinous condensation product of ingredients comprising an aldehyde and an alkyl ester of a bis-(diamino pyrimidyl thio) pyropropionic acid.

12. A composition of matter comprising the resinous condensation product of ingredients comprising an aldehyde and an alkyl ester of an alpha,beta-bis-(4,6 - diamino pyrimidyl - 2 thio) propionic acid.

13. A resinous composition comprising the condensation product of ingredients comprising formaldehyde and methyl alpha,beta-bis-(4.6-diamino pyrimidyl-2 thio) propionate.

14. A composition comprising the resinous product of reaction of ingredients comprising a urea, an aldehyde and a compound corresponding to the general formula

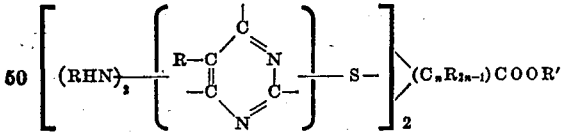

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

15. A composition comprising the resinous product of reaction of ingredients comprising urea, formaldehyde and a compound corresponding to the general formula

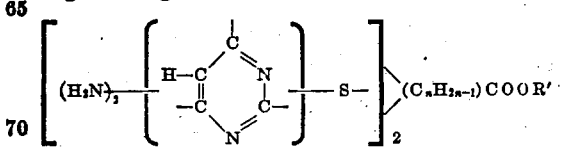

where $n$ represents an integer and is at least 1 and not more than 2, and R' represents a member of the class consisting of monovalent aliphatic hydrocarbon radicals and monovalent aromatic and nuclearly halogenated aromatic hydrocarbon radicals.

16. A resinous composition comprising the product of reaction of ingredients comprising dimethylol urea and a compound corresponding to the general formula

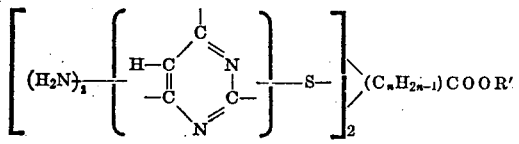

where $n$ represents an integer and is at least 1 and not more than 2, and R' represents a member of the class consisting of monovalent aliphatic hydrocarbon radicals and monovalent aromatic and nuclearly halogenated aromatic hydrocarbon radicals.

17. A composition comprising the resinous product of reaction of ingredients comprising an aminotriazine, an aldehyde and a compound corresponding to the general formula

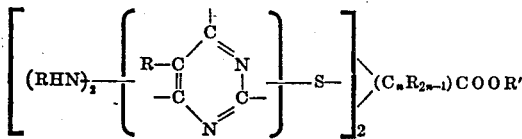

where $n$ represents an integer and is at least 1 and no more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

18. A composition comprising the resinous product of reaction of ingredients comprising melamine, formaldehyde and a compound corresponding to the general formula

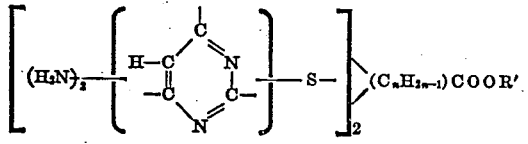

where $n$ represents an integer and is at least 1 and not more than 2, and R' represents a member of the class consisting of monovalent aliphatic hydrocarbon radicals and monovalent aromatic and nuclearly halogenated aromatic hydrocarbon radicals.

19. A heat-curable composition comprising the heat-convertible resinous reaction product of (1) a partial condensation product of ingredients comprising formaldehyde and a compound corresponding to the general formula

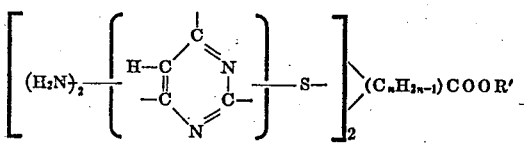

where $n$ represents an integer and is at least 1 and not more than 2, and R' represents a member of the class consisting of monovalent aliphatic hydrocarbon radicals and monovalent aromatic and nuclearly halogenated aromatic hydrocarbon radicals, and (2) a curing reactant.

20. The method of preparing new synthetic compositions which comprises effecting reaction between ingredients comprising an aldehyde and a compound corresponding to the general formula

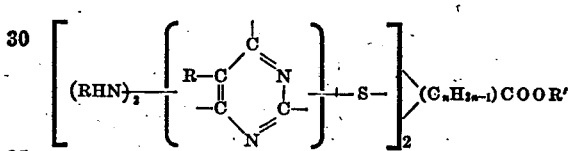

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

GAETANO F. D'ALELIO.
JAMES W. UNDERWOOD.

CERTIFICATE OF CORRECTION.

Patent No. 2,328,964. September 7, 1943.

GAETANO F. D'ALELIO, ET AL.

It is hereby certified that error appears in the printed specification of the above numbered patent requiring correction as follows: Page 1, first column, line 30, after "radicals" insert a period; page 2, first column, line 30, after "4" and before "thio" strike out the hyphen; and second column, line 5, for "alpha-beta" read --alpha,beta--; page 3, first column, line 4, for "primidyl-2" read --pyrimidyl-2--; page 4, second column, line 19, before "28%" strike out the opening parenthesis; line 68, for "reactant" read --reactants--; page 6, first column, line 27, for "formulae" read --formula--; page 7, first column, line 38, after "penta" insert a hyphen; page 8, second column, line 33, claim 11, for "pyropropionic" read --propionic--; page 9, first column, line 30, claim 17, for "no" read --not--; and second column, line 29-35, claim 20, for that portion of the formula reading "$(C_nH_{2n-1})COOR'$" read --$(C_nR_{2n-1})COOR'$--; and that the said Letters Patent should be read with this correction therein that the same may conform to the record of the case in the Patent Office.

Signed and sealed this 9th day of November, A. D. 1943.

(Seal)

Henry Van Arsdale,
Acting Commissioner of Patents.